United States Patent [19]

Gutman et al.

[11] Patent Number: 4,874,224
[45] Date of Patent: Oct. 17, 1989

[54] VEHICULAR DISPLAY VIEW CONTROL SYSTEM

[75] Inventors: Robert F. Gutman, St. Clair Shores; Robert Migrin, Dearborn, both of Mich.

[73] Assignee: United Technologies Automotive, Inc., Dearborn, Mich.

[21] Appl. No.: 198,025

[22] Filed: May 24, 1988

[51] Int. Cl.$^4$ ............... G02B 27/14; G01D 11/28; B60Q 1/00; G08B 5/36

[52] U.S. Cl. ..................... 350/174; 350/320; 362/29; 340/815.13; 340/459

[58] Field of Search ............ 350/169, 171, 174, 320, 350/601, 602; 362/29, 30, 85, 100; 340/52 F, 815.13, 815.14, 815.15, 815.16, 815.17, 815.18

[56] References Cited

U.S. PATENT DOCUMENTS 1,871,877  8/1932  Buckman ........................... 350/174
4,635,033  1/1987  Inukai et al. ..................... 340/52 F

FOREIGN PATENT DOCUMENTS 2735251  2/1979  Fed. Rep. of Germany .... 340/52 F
0182540  11/1982  Japan ............................. 340/52 F

OTHER PUBLICATIONS

Sears & Zemansky *University Physics* (Addison-Wesley Pub. Co., Inc. 3rd Ed., 1964) pp. 832-836 and 841-846.
John A. Kuecken *Fiberoptics* (Tab Books, Inc., 1980) pp. 129-137.

*Primary Examiner*—Bruce Y. Arnold
*Assistant Examiner*—Ronald M. Kachmarik

[57] ABSTRACT

A view control prism display system in which the viewable angle of an informational display (15) is controlled and limited to certain desired areas (17) by utilizing the reflective and refractive properties of an optical prism element (10) used in association with the informational display. In the exemplary application of a button (6B) in an instrument cluster in an automotive environment (5), the informational display is included as an applique (15) on a flat surface provided adjacent to but spaced from the optical prism by an air gap (14). A further, "decorated" surface (13) which can be painted black or be frosted, is provided on an adjacent, bottom surface of the optical prism. Within the desired viewing angle in front (11) of the button, the viewer will see the refracted image of the information contained on the applique, while those outside (18) of the desired viewing angle will "see" the reflected image of the non-informational "decorated" surface. Likewise, by properly designing the angles of the various surfaces of the optical prism and the locations of the two surfaces, the informational image will not be projected onto the interior side ("CVZ") of the windshield (9), which is located outside of the desired viewing range of angles, preventing any daytime or nighttime reflections from being generated on the windshield or, if so designed, any of the side windows.

32 Claims, 3 Drawing Sheets

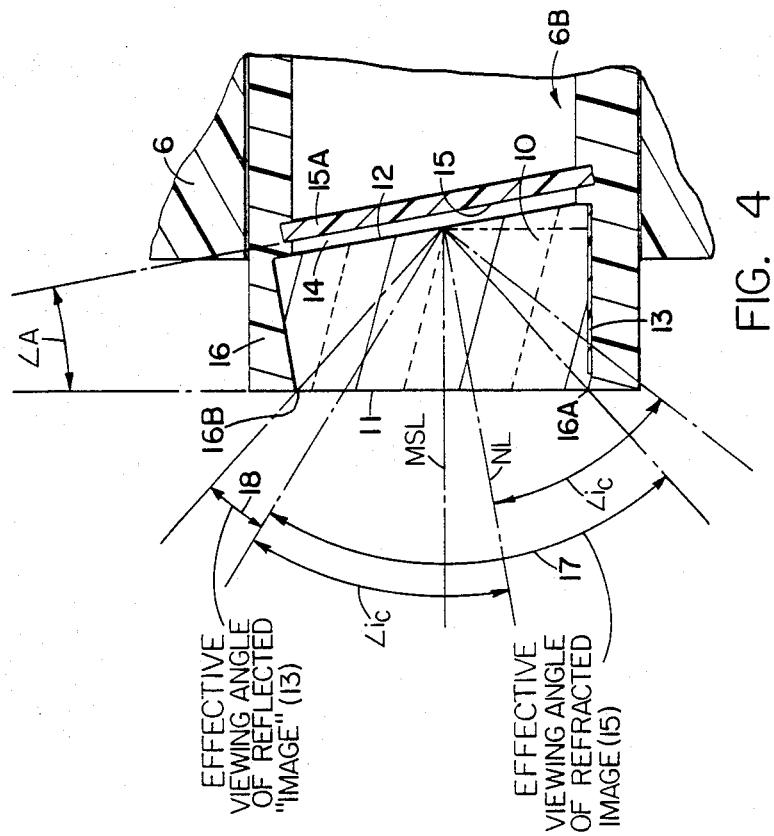
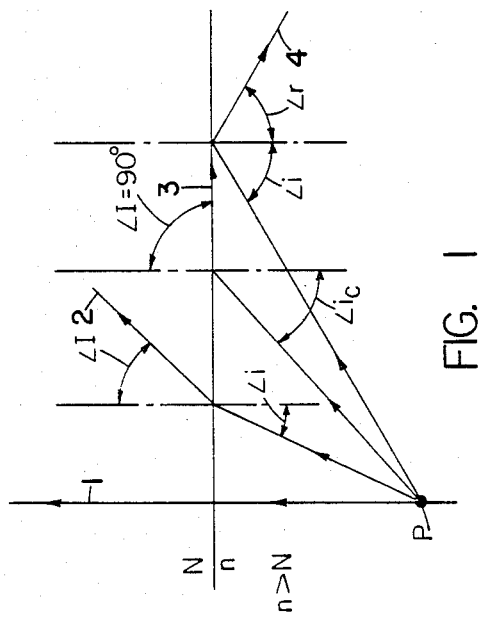
FIG. 4
FIG. 1

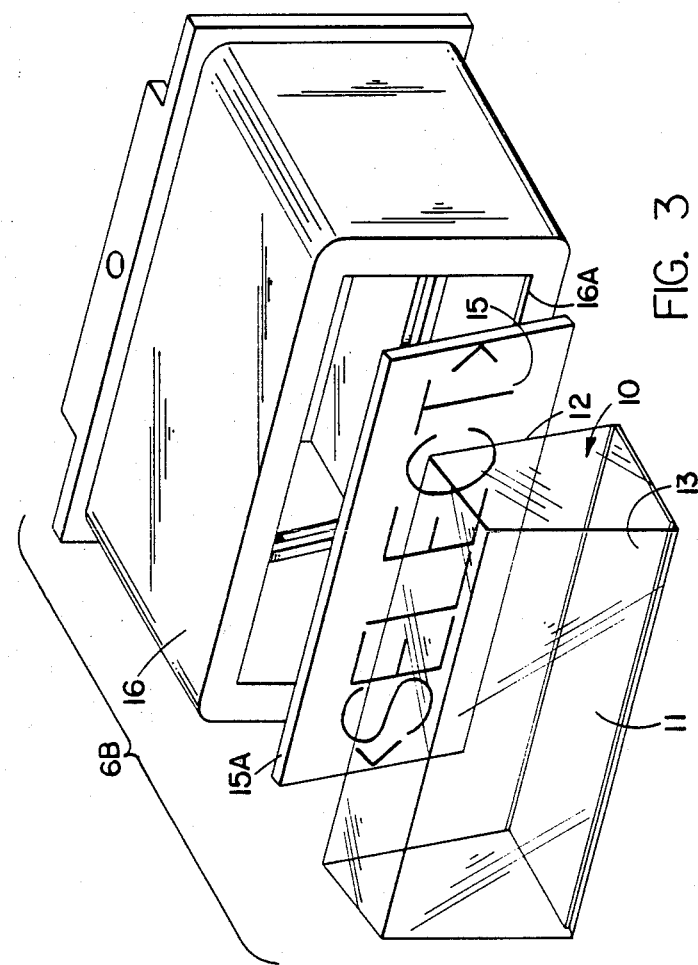

VEHICULAR DISPLAY VIEW CONTROL SYSTEM

DESCRIPTION

1. Technical Field

The present invention relates to informational displays in an automotive environment and more particularly to controlling the angles from which the informational image can be viewed or is projected. An exemplary application is a push button informational display as part of an instrument cluster in a vehicle's control system, in which the viewing or projection angle is controlled by utilizing the inherent, reflective and refractive properties of the transparent materials and associated items utilized in the button structure. The invention in its most preferred embodiment is particularly designed to prevent the informational display from being projected unto the windshield of the vehicle.

2. Background Art

It is often desired in, for example, an automotive environment to restrict the possible viewing angle of an informational display so that the information of the display can only be viewed, for example, by the driver of the vehicle. Also, it is desirable to ensure in such an environment that the informational display is not projected or reflected on to the interior side of the windshield in order to keep the windshield clear of any reflective, distracting images.

Additionally, in other instances, it may be desirable to restrict the view from the passenger(s) or to allow the side passenger to view it but to restrict to some degree the driver from viewing the image(s) or having the image(s) possibly distract the driver from the driving responsibilities and functions.

Also, in still other instances, there may be a desire to have some information displayed on the windshield in, for example, a "heads up" type display, but not to have other information displayed on the windshield, although available for viewing in some other areas; etc.

In the prior art these desired goals may be typically achieved by using baffles or mechanical blocks which prevent the informational display from being viewed other than as desired or to prevent reflections of the informational display on to the interior side of the windshield. However, such "solutions" have many drawbacks, including cost factors, complexity in instrument housing designs, and poor aesthetics. In contrast to the prior art approaches, the present invention utilizes the inherent reflective and refractive optical properties of the structure of the informational display itself to limit the viewable area(s) of the informational indicia and prevent it from being presented or projected to other area(s).

DISCLOSURE OF INVENTION

Thus, the present invention utilizes the inherent reflective and refractive optical properties of the informational display itself to control the effective viewing or image projecting angle of the informational display. In the preferred embodiment it achieves this by utilizing two "display" surfaces, one containing the informational indicia or graphics to be displayed and the other having a non-informational display surface, which can be for example either a black or frosted surface. The structure and optical properties of the structure are designed to display the desired informational display by refracted light in the desired area of viewing the information, while "displaying" the non-informational, non-light projecting surface by means of "reflected" light off of that surface in all of the other areas in which viewing of the information or the projection of the information is not desired.

An exemplary application of the present invention is a push button included as part of an instrument cluster in an automotive environment and having information displayed through its front surface. The buttons made in accordance with the principles of the present invention contain a light control prism element which controls the viewing and projection angle of the information associated with the button, which can be illuminated or can use natural or other ambient light. The designed viewable or projection angle of the informational display of the button depends upon the critical angle of the particular prism design used in the button, as well as on other factors, including the particular geometry and spatial relationship(s) and material(s) used.

For example, in the preferred, exemplary embodiment, the informational display is included on an applique located behind the prism element and separated therefrom by an air filled gap. Associated with another part of the prism is a "decorated" surface, which can be merely black or frosted or otherwise diffuse. Depending on the critical angle of the particular prism design, a person in the vehicle would view the refracted image of the informational applique until the critical viewing angle of the prism element was crossed. Once this occurred, the individual would then "view" the "reflected" image from the "decorated" surface, which in essence is a non-image. In this manner, the informational image can only be viewed in the area permitted by the optical properties of the prism and the relative location of the two surfaces, while the non-image is "projected" on to the windshield, eliminating any nighttime reflections from being generated.

Thus, information, for example, from telltales, graphics, etc., once visible to other occupants, can be directed so that only the desired occupant may view the information.

It is noted that the display, for example, the button, need not be illuminated for the view control of the present invention to work. Additionally, light controlling film is not required. Also, daytime color can be maintained.

Although, applying the principles of the invention to an illuminated button of an instrument cluster in an automotive environment represents a preferred application, the invention is not so restricted.

The foregoing and other features and advantages of the present invention will become more apparent from the following further description and drawings.

BRIEF DESCRIPTION OF DRAWINGS

FIG. 1 is a simplified, graphical representation of light rays at various angles striking a surface between two different mediums, illustrating at what angles the light rays pass through the surface and are refracted, and at what other angles the light rays are totally internally reflected by the surface, with the two ranges of angles being separated by the critical angle of the optical system, illustrating some of the optical principles used in the present invention.

FIG. 2 is a side, generalized, simplified view showing the exemplary automotive application of the present invention, including a series of push buttons in an instrument cluster, or other informational displays, located in the instrument panel of an automobile below the windshield and the "clear vision zone" (CVZ) on the windshield in which the invention prevents the information associated with the buttons from being displayed; while FIG. 3 is an exploded, perspective view of one of the exemplary push button structure elements of the embodiment of FIG. 2; while FIG. 4 is a side, cross-section view of the assembled push button structure of FIG. 3, showing in greater detailed the optical and internal structural characteristics of the button structure.

BEST MODE FOR CARRYING OUT THE INVENTION

Figure 2:
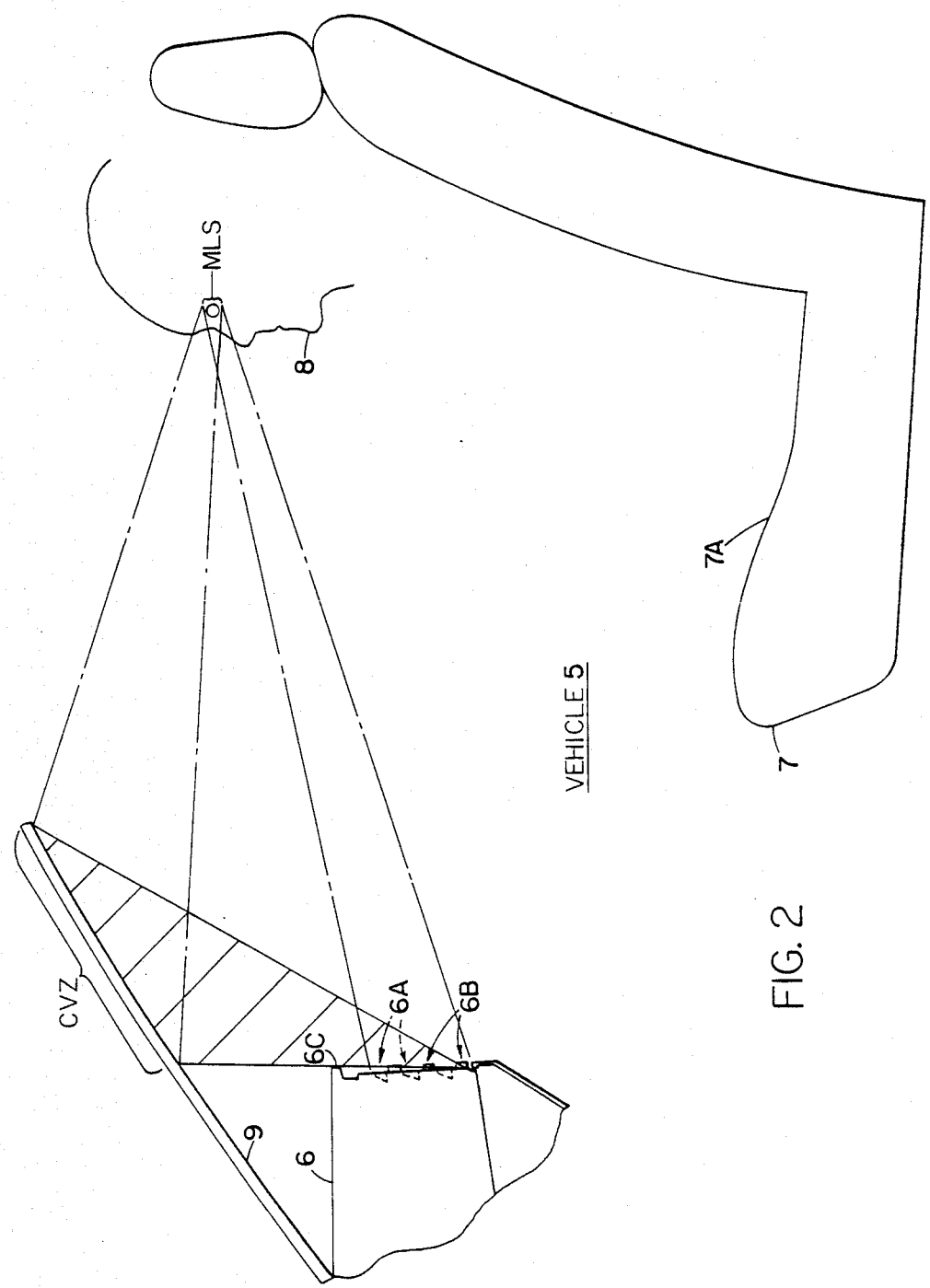

For a better understanding of the present invention, some of the optical principles used in the present invention will be discussed with respect to FIG. 1, and thereafter a detailed description of the exemplary, preferred embodiment of the invention will be described in detail with reference to FIGS. 2, 3 and 4.

Pertinent Optical Principles

From basic optics it is known that the angle of reflection (r) of a light ray striking a surface is equal to the angle of incidence (i) for all colors and any pair of substances. This is known as the law of reflection.

For monochromatic light and for a given pair of substances, "n" and "N", on opposite sides of the surface of separation, the ratio of the sine of the angle "i" (between the ray in substance "n" and the normal) and the sine of the angle "I" (between the ray in substance "N" and the normal) is a constant. This is known as the law of refraction, which is usually credited to Willebroard Snell (1591–1626). It is commonly referred to as "Snell's Law".

However, the laws of reflection and refraction relate only to the directions of the corresponding rays, and further consideration must be given to the amount or fraction of the incident light that is reflected, in comparison to that which is refracted. These depend on the angle of incidence "i" involved in the light ray striking the surface interface.

If the angle "i" is that of a beam of monochromatic light traveling in a vacuum, the constant of Snell's Law is the index of refraction of the other substance or medium. It is noted that the index of refraction of a vacuum is considered to be "1", and for most purposes the index of refraction of air likewise can be assumed to be unity, since its variance is relatively so small (actually equal to 1.0002918). In contrast, the index of refraction of, for example, most of the common glasses used in optical instruments lies between 1.46 and 1.96.

There are only a few substances having indices larger than this value, diamond being one of them, with an index of 2.42. For comparative purposes it is also noted that water has an index of refraction of 1.33, and carbon disulfide in liquid form has an index of 1.63. Most gases have an index very close to unity, most being equal to "1" out to three significant digits, as noted above for air.

In providing these exemplary indices of refraction for various media, it should be understood that these do have some variance, depending on the wavelength of the monochromatic light being used in making the measurements. Such measurements are typically taken with a light corresponding to the yellow light from a sodium flame, having a wavelength of 589 nm. or approximately $0.6 \times 10^{-6}$ meters.

The application of this optical knowledge in the present invention may be better understood in reference to FIG. 1, which schematically shows a number of exemplary light rays 1, 2, 3 and 4 diverging from a point source "P" in a medium of index of refraction "n" and striking the surface of a second medium of index "N" at varying angles "i", going from the normal (ray 1) to the oblique (ray 4), where "n" is greater than "N".

From Snell's Law:

$$\sin I = n/N \sin i.$$

Since n/N is greater than unity, sin I is larger than sin i and will equal unity (i.e., I=90°) for some angle "i" less than 90°. This is illustrated by light ray 3 in FIG. 1, which emerges just grazing the surface at an angle of refraction "I" of 90°. The angle of incidence, for which the refracted ray emerges tangent to the surface, is called the "critical angle" and is designated by $i_c$ in FIG. 1 and, as noted, is exemplified by light ray 3.

If the angle of incidence "i" is greater than the critical angle "$i_c$", as is true for light ray 4, the sine of the angle of refraction, as computed by Snell's Law, is greater than unity. This may be interpreted to mean that, beyond the critical angle, the ray does not pass into the upper medium but is totally internally reflected at the boundary surface.

Total internal reflection can occur only when a ray is incident on the surface of a medium whose index is smaller than that of the medium in which the ray is traveling. Such a situation is present, for example, when light is traveling in glass or a transparent plastic and is incident on a boundary with an air interface.

Thus, the critical angle of two given substances may be found by setting:

$$I = 90° \text{ or } \sin I = 1$$

in Snell's Law. One then has:

$$\sin i_c = N/n.$$

The critical angle of a glass-air surface, taking 1.50 as a typical index of refraction of glass, is:

$$\sin i_c = 1/1.50 = 0.67,$$

and $$i_c = 42°.$$

Thus, for such a glass-air interface, light rays having an angle of incidence "i" less than 42° (like ray 2) will pass through the interface and be refracted at the interface, while light rays having an angle of incidence greater than 42° (like ray 4) will be totally internally reflected and not passed through the glass-air interface.

This "critical angle," when the "reverse" is considered, is sometimes called the "angle of extinction." This is the limiting angle, where the sine of the transmitted angle of the transmitted ray would begin to exceed "1". Thus, if one were in a denser medium "looking out," this limiting angle would occur when the outside "disappeared" or, moving from the reverse direction, "appeared."

For example, this limiting angle for water is 48.59°. This effect may be observed when swimming underwater. Outside of the limiting angle, the water surface appears silvery and quite opaque; while, within it, the outside is visible.

These known optical properties and principles [note for example Sears and Zemansky's well known and extensively used educational treatise *University Physics* (Addison-Wesley Pub. Co., Inc., 3rd Ed., 1964), as well as John A. Kuecken's book *Fiberoptics* (Tab Books, Inc., 1980)] are utilized in the present invention to control the allowed viewing angle of the information contained in a display or in controlling the angle of projection of the informational display, particularly in an automotive application, all of which will be better understood from a consideration of the exemplary automotive application described in detail below.

Exemplary Instrument Cluster, Push Button Application

As can be seen in the generalized view of FIG. 2, a typical, exemplary vehicle 5 includes a dashboard 6 with various instrument and other informational displays 6A, including an exemplary series of push buttons 6B. Exemplary push buttons 6B, gathered together in a button cluster, could be the button switches or informational display for the "Select" button for an extensive computerized informational display, the "Twilight Sentinel" for controlling the head lights, the panel dimming switch and the rear window defogger switch, etc., among many others.

Also included is a driver's seat 7 with a seating surface 7A upon which the occupant 8 sits. Of course, typically there will be other passenger seats as well, usually to the side of the driver, as well one or more behind the driver.

A windshield 9 is positioned in front of the driver 8 and typically extends above the driver's main lines of sight "MLS". The norm for the lines of sight for most drivers has been well established in studies, and the necessary lines, spacing and dimensions for a particular vehicle are usually reasonably well defined in the design stage of a vehicle.

One of the prime design criteria of this exemplary, preferred embodiment of the present invention is to prevent any light or informational display from the instrument panel or dashboard 6 to be projected unto the windshield 9, which could possibly distract or block the driver's view of, for example, the road, particularly in the desired clear vision zone "CVZ"; while, of course, still allowing the driver to view the informational displays on the instrument panel 6, when the driver glances down.

As will be explained more fully below in connection with an exemplary push button switch, this is achieved using the optical principles discussed above.

It is noted that FIG. 2 is highly simplified for general purposes of illustration and is not at all intended to be a literal, scale drawing.

As can be seen in FIGS. 3 and 4, an exemplary push button 6B in accordance with the present invention includes a transparent optical element 10 having three operative faces- a front, light transmitting face or surface 11, a refractive face or surface 12 on its backside, and a secondary, "reflective" surface 13 at its bottom between the front and back faces 11, 12. The refractive surface 12, which also reflects light (depending on the angle of incidence of the light ray), has on its exterior side an air gap 14 (note FIG. 4) with an informational indicia element 15 in the form of a graphical applique positioned adjacent or in juxtaposition to it parallel to the angular backside of the optical element 10.

As can be seen in FIG. 4, the backside face 12 angularly diverges down away from the front face 11, the angle "A" between the two being an exemplary 10°. The required angle "A" between the backside 12 and the front side 11 is based on the relationship between the location of the button 6B in the vehicle, compared to the relative angle and position of the windshield 9 (or window).

The front surface 11 can also serve as the pushing surface for actuating the switch(es) associated with the button. Although a single, integral optical element structure is preferred, the optical element 10 could be made from a number of individual optical sub-elements combined together, if so desired.

The optical element 10 and its informational or graphical applique 15 are contained within an opaque button housing 16, which in turn is mounted for switch actuating movement on the instrument panel 6. The illustrated button switch 6B could be, for example, a rectangularly configured, rocker switch for a selective display system, such as for example that which is disclosed in co-pending U.S. application Ser. No. 07/112,988 entitled "Inter-Locked Button Actuated Matrix Switch System, Particularly For Automotive Instrumentation With Button Cluster Switching" of Robert F. Gutman, the co-inventor of the present invention, the disclosure of which application is incorporated herein by reference.

In such an application, the applique 15 could have, for example, the informational indicia "<SELECT>" imprinted thereon, as illustrated, identifying the function of the button and the two, alternate, side directions it can be pushed to, in its "selection" function. Such a button can be back lighted using a secondary light source or can be read by the driver 8 using ambient or natural light.

The optical element 10, which serves as a lens or prism, could be made of, for example, optical glass or, for greater cost effectiveness, of polycarbonate or acrylic resin, such as, for example, Rhome & Hass's "V920" Plexiglass ®, which has an index of refraction of 1.491. The secondary, reflective surface 13 could be a decorated surface, such as for example a black or other darkly colored surface or some diffuse or "wetted" surface, and should be devoid of any informational indicia or display.

Additionally, although the applique 15 could be applied directly to the backside of the optical element 10, rather than on a separate, parallel plate or support 15A as illustrated in FIG. 4, there always needs to be some form of an air gap 14, even a minute one, between them to provide the less dense interfacing medium with a lesser index of refraction (similar to "N" of FIG. 1) than that of the optical element 10 (analogous to "n" of FIG. 1). This air gap 14 can still exist, even when the applique 15 is applied to the backside; however, an intimate contact wetting interface between the two should not be present to insure the existence of some air gap.

Remembering the optical principles discussed with respect to FIG. 1 and applying them to the push button structure 6B, it should be understood that the "<SELECT>" informational indicia on the applique 15 will be seen in the first, relatively lower areas 17 on both sides of the normal line "NL" within the critical angles but not be seen or be projected into the upper, second area 18 above the upper critical angle "$i_c$", which critical angle, as measured with respect to the line "NL" normal to the backside 12, for the acrylic indicated is 42.1°. Thus, although in the effective refracted image viewing area 17, the informational indicia 15 appears to be imprinted on front surface 11, which serves as the button pushing surface, of the button 16, it cannot be seen in the effective "reflected" image area 18, although the viewer or the "CVZ" is still in front of the button.

Of course, due to the field of vision being restricted by the sides 16 of the outer button housing, the effective fields of view of the areas 17 & 18 may be less than the theoretical ranges when just considering the angles of incidence of the light rays striking internally the back surface 12, as, for example, occurs due to the lower edge 16A blocking off part of the lower, theoretical, refracted viewing area 17, and the upper edge 16B blocking off the upper part of the "reflected" viewing area 18.

With respect to the terms "lower" and "upper" or "below" and "above" as used herein, it should be understood that they are being used with respect to the "critical angle" as a reference line, which does not necessarily means that, for example, all of the "upper" area 18 is at a higher vertical position than all of the "lower" area 17. Indeed, in the push button 6B, as these areas are extended outwardly, some of the viewing area 17 will be at a higher vertical position than some of the non-viewing area 18. Also, when the invention is used to define the viewing and non-viewing areas in a lateral direction, that is allowing viewing in one area but not in an area along-side or next to it, the equivalent areas 17 & 18 may be at the same relative vertical positions.

In the second, non-informational area 18 the "reflected image" of the secondary surface 13 is "seen," which is reflected off of the back surface 12. Because of the black or darkly colored or diffuse nature of the bottom surface 13, in essence, "nothing" or "blackness" is "seen." Thus, the informational display of the indicia on the applique 15 is optically prevented from being projected onto the "CVZ" on the windshield, particularly at night time.

Thus, it should be understood that, in referring to light being reflected off of the secondary surface 13 or the image of the surface 13 being reflected from the back surface 12 to be "viewed" in the second area 18, reference is usually being made to the imaginary lines of reflection which would "exist" in a mathematical, geometrical or optical analysis of the optical element and in particular in the relationship between the secondary surface 13 and the refractive, reflective surface 12, rather than actual light rays necessarily being reflected or transmitted.

If desired, as illustrated, some baffling or structural block 6C can be included in the dashboard 6 as an auxiliary field restriction technique. However, as can be visualized in FIG. 2, without the invention such limited baffling would be ineffective in eliminating information display or reflection in the indicated "CVZ" as achieved by the present invention in an unobtrusive, aesthetically pleasing manner.

As can be seen in FIG. 4 and as noted above, the surrounding housing 16 also can be used to limit the effective fields of view, and its design also can play a significant role in effecting the desired areas 17 & 18 of informational viewing and non-viewing, respectively. The view limiting effect of the housing 16 depends on for example how deeply the backside 12 and the applique 15 are positioned back within the housing 16 and the angle "A" made between them and, for example, the top plane of the housing.

Thus, depending on whether areas 17 or 18 are involved, one is able to view the refracted image of the applique 15 through the rear non-decorated face 12 of the optical prism element 10 until the critical angle "$i_c$" of the back surface 12 is crossed, after which one then "views" the reflected "image," which is the bottom surface 13 "reflected" off of the rear, now mirror-like surface 12.

To be sure it is clear as to where the critical angle is measured from, namely from the normal line "NL", which is not necessarily the horizontal center line or plane, the horizontal midsection line "MSL" has also been included in FIG. 4.

From the discussion of the "relevant optical principles" above, it should be apparent that there are a number of interdependent, inter-related variables which can be utilized and varied with respect to one another in designing an automotive display view control system in accordance with the present invention and, due to their inter-relationships, should be appropriately coordinated to the degree necessary to achieve the desired results. These include:

the geometry of the optical element 10 itself and the angles and separation distances of its various operative, front, refractive and secondary/reflective faces 11, 12 & 13, respectively, including the relative placement of the angled surfaces with respect to the areas from which viewing is to be allowed and the areas for which projection is to be eliminated;

the relative indices of refraction of the more dense optical element 10 and the interfacing, less dense medium 14, and in particular the materials used for the optical element 10 and the interfacing medium 14, and whether they are solid, liquid or gaseous; and the wavelength of the light used in association with the informational display.

Although the "best mode" has been described with respect to eliminating projections unto the windshield, it should be understood that the present invention can also be used to restrict side viewing, preventing, for example, informational displays from being seen by a non-driver passenger in the vehicle to the side of the driver, or vice-versa.

Although this invention has been shown and described with respect to a detailed, exemplary embodiment thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

We claim:

1. An automotive informational display system using associated light of the visible spectrum to view informational indicia and having limited angles of viewing the informational indicia from in front of the display system, comprising:

a vehicle having at least one passenger seat having a seating surface upon which an occupant sits in while traveling in the vehicle;

a light transmitting optical element, located in said vehicle in a position viewable by an occupant sitting on said seating surface, having a transparent body having a first index of refraction and having at least three, spaced, operative faces, including a front, light transmitting surface,
an internal refractive surface, and
a separate, internal, secondary surface spaced from said refractive surface;
an interfacing medium interfacing with said refractive surface and having a second, different index of refraction less than that of said first index of refraction; and
an informational indicia element, associated with said interfacing medium and said refractive surface of said optical element, having the informational indicia associated with it to be displayed to a first limited area above the seating surface of said passenger seat and located in front of said front, light transmitting surface of said optical element using light of the visible spectrum, and undisplayed at a second, limited area different than said first area but also located at a vertical level above the seating surface of said passenger seat and in front of said front, light transmitting surface of said optical element, said front, light transmitting surface being viewable from both said first and said second areas;
the geometry of said optical element itself and the relative angles and separation distances of said spaced, light transmitting, reflective and secondary surfaces,
the relative indices of refraction of said optical element and said interfacing medium, and
the wavelength(s) of the light used in association with the informational display,
in combination causing light coming from said indicia element to be transmitted to said first area and preventing light from said indicia element from being transmitted to said second area, the informational indicia being viewable in said first area but unseen in said second area.

2. The automotive informational display system of claim 1, wherein
the geometry of said optical element itself and the relative angles and separation distances of said spaced, light transmitting, reflective and secondary surfaces,
the relative indices of refraction of said optical element and said interfacing medium, and
the wavelength(s) of the light used in association with the informational display,
in combination also cause at least some light coming from said separate secondary surface to be transmitted to said second area by being reflected off of said refractive surface.

3. The automotive informational display system of claim 2, wherein said secondary surface has a reflective, interior side which is devoid of informational content.

4. The automotive informational display system of claim 3, wherein said secondary, reflective surface is darkly colored.

5. The automotive informational display system of claim 3, wherein said secondary, reflective surface includes a diffuse surface.

6. The automotive informational display system of claim 1, wherein said first area is located below said second area.

7. The automotive informational display system of claim 1, wherein said vehicle body includes a windshield area, with said first area being located at eye level for an occupant seated on said seating surface and said second area being the windshield area of said vehicular body.

8. The automotive informational display system of claim 1, wherein said vehicle body includes an instrument panel having at least one push button, said optical element being integrated into said push button.

9. The automotive informational display system of claim 8, wherein said front, light transmitting surface of said optical element forms the front, pushing surface of said push button.

10. The automotive informational display system of claim 9, wherein said front, light transmitting surface of said optical element is at least generally flat and vertically disposed, said refractive surface is at least generally flat and is located on the backside of said optical element generally opposed to said front surface but diverging back downwardly away from said front surface, and said secondary surface is located on the bottom side of said optical element between said front surface and said refractive surface.

11. The automotive informational display system of claim 10, wherein said interfacing medium is composed of air and said informational indicia element is an applique applied to the exterior surface of said refractive surface with an air film gap between them.

12. The automotive informational display system of claim 10, wherein said backside makes an angle of about ten degrees with said front surface.

13. The automotive informational display system of claim 1, wherein said front, light transmitting surface of said optical element is at least generally flat and vertically disposed, said refractive surface is at least generally flat and is located on the backside of said optical element generally opposed to said front surface but diverging downwardly away from said front surface, and said secondary surface is located on the bottom side of said optical element between said front surface and said refractive surface.

14. The automotive informational display system of claim 1, wherein said interfacing medium is composed of air and said informational indicia element is an applique applied to the exterior surface of said refractive surface.

15. The automotive informational display system of claim 1, wherein said first area is within the critical angle of said refractive surface.

16. The automotive informational display system of claim 15, wherein said optical element is included within an opaque housing having a frontal edge located adjacent to the line normal to the one of said two areas most immediately adjacent to said informational indicia.

17. An automotive informational display system for an instrument panel in a vehicle, which vehicle has at least one seat having a seating surface upon which an occupant sits in while traveling in the vehicle, the instrument panel having at least one push button, the display system using associated light of the visible spectrum to view informational indicia associated with the push button and having limited angles of viewing the informational indicia from in front of the push button, comprising:
a push button;
a light transmitting optical element included as part of said push button to be located in the vehicle in a position viewable by an occupant sitting on the seating surface, having a transparent body having a first index of refraction and having at least three, spaced, operative faces, including
a front, light transmitting surface,
an internal refractive surface, and a separate, internal, secondary surface spaced from said refractive surface, said secondary surface having a reflective, interior side devoid of informational content;

an interfacing medium interfacing with said refractive surface and having a second, different index of refraction less than that of said first index of refraction; and an informational indicia element, associated with said interfacing medium and said refractive surface of said optical element, having the informational indicia associated with it to be displayed to a first limited area above the seating surface of said passenger seat and located in front of said front, light transmitting surface of said optical element using light of the visible spectrum, and undisplayed at a second, limited area different than said first area but also located at a vertical level above the seating surface of said passenger seat and in front of said front, light transmitting surface of said optical element, said front, light transmitting surface being viewable from both said first and said second areas;

the geometry of said optical element itself and the relative angles and separation distances of said spaced, light transmitting, reflective and secondary surfaces, the relative indices of refraction of said optical element and said interfacing medium, and the wavelength(s) of the light used in association with the informational display, in combination causing light coming from said indicia element to be transmitted to said first area and preventing light from said indicia element from being transmitted to said second area, the informational indicia being viewable in said first area but unseen in said second area, and in combination also causing any light coming from said separate, secondary surface to be transmitted to said second area by being reflected off of said refractive surface.

18. The automotive informational display system of claim 17, wherein said secondary, reflective surface is darkly colored.

19. The automotive informational display system of claim 17, wherein said secondary, reflective surface includes a diffuse surface.

20. The automotive informational display system of claim 17, wherein said first area is located below said second area.

21. The automotive informational display system of claim 17, wherein the vehicle includes a windshield area, with said first area being located at eye level for an occupant seated on said seating surface and said second area being the windshield area of the vehicle.

22. The automotive informational display system of claim 17, wherein said front, light transmitting surface of said optical element forms the front, pushing surface of said push button.

23. The automotive informational display system of claim 22, wherein said front, light transmitting surface of said optical element is at least generally flat and vertically disposed, said refractive surface is at least generally flat and is located on the backside of said optical element generally opposed to said front surface but diverging downwardly away from said front surface, and said secondary surface is located on the bottom side of said optical element between said front surface and said refractive surface.

24. The automotive informational display system of claim 23, wherein said backside makes an angle of about ten degrees with said front surface.

25. The automotive informational display system of claim 17, wherein said interfacing medium is composed of air and said informational indicia element is an applique applied to the exterior surface of said refractive surface with an air film gap between them.

26. The automotive informational display system of claim 17, wherein said first area is within the critical angle of said refractive surface.

27. The automotive informational display system of claim 26, wherein said optical element is included within an opaque housing having a frontal edge located adjacent to the line normal to said areas most immediately adjacent to said informational indicia.

28. A method of limiting the viewing area of an informational display in a vehicle to a first area and preventing it from being viewed or projected to a second area, comprising the following steps:

(a) placing the informational indicia to be displayed in juxtaposition to a refractive, backside surface of an optical prism element through which optical element light in the visible spectrum must past through to and out a front, light transmitting surface of the optical element for the indicia to be viewed;

(b) providing an interfacing medium between the informational indicia and the optical element having an index of refraction less than that of said optical element;

(c) providing a secondary surface on said optical element adjacent to and between the backside and the front side of the optical element; and (d) arranging and selecting the geometry of said optical element itself and the relative angles and separation distances of the spaced, light transmitting, refractive and secondary surfaces, the relative indices of refraction of said optical element and said interfacing medium, and the wavelength(s) of the light used in association with the informational display, to, in combination, cause light coming from said informational indicia to be transmitted to said first area and preventing light from said indicia element from being transmitted to said second area, the informational indicia being viewable in said first area but unseen in said second area, and, in combination, also causing at least some light coming from said separate, secondary surface to be transmitted to said second area by being reflected off of said refractive surface.

29. The method of claim 28, wherein there is included the step of:

providing said secondary surface with a reflective, interior side which is devoid of informational content.

30. The method of claim 29, wherein there is included the step of:

darkly coloring said secondary, reflective surface.

31. The method of claim 29, wherein there is included the step of:

providing said secondary, reflective surface with a diffuse surface.

32. The method of claim 28, wherein there is included the steps of:

making said front, light transmitting surface of said optical element at least generally flat and vertically disposed, making said refractive surface at least generally flat and locating it on the backside of said optical element generally opposed to said front surface but diverging downwardly away from said front surface, and providing said secondary surface on the bottom side of said optical element between said front surface and said refractive surface.

* * * * *